UNITED STATES PATENT OFFICE.

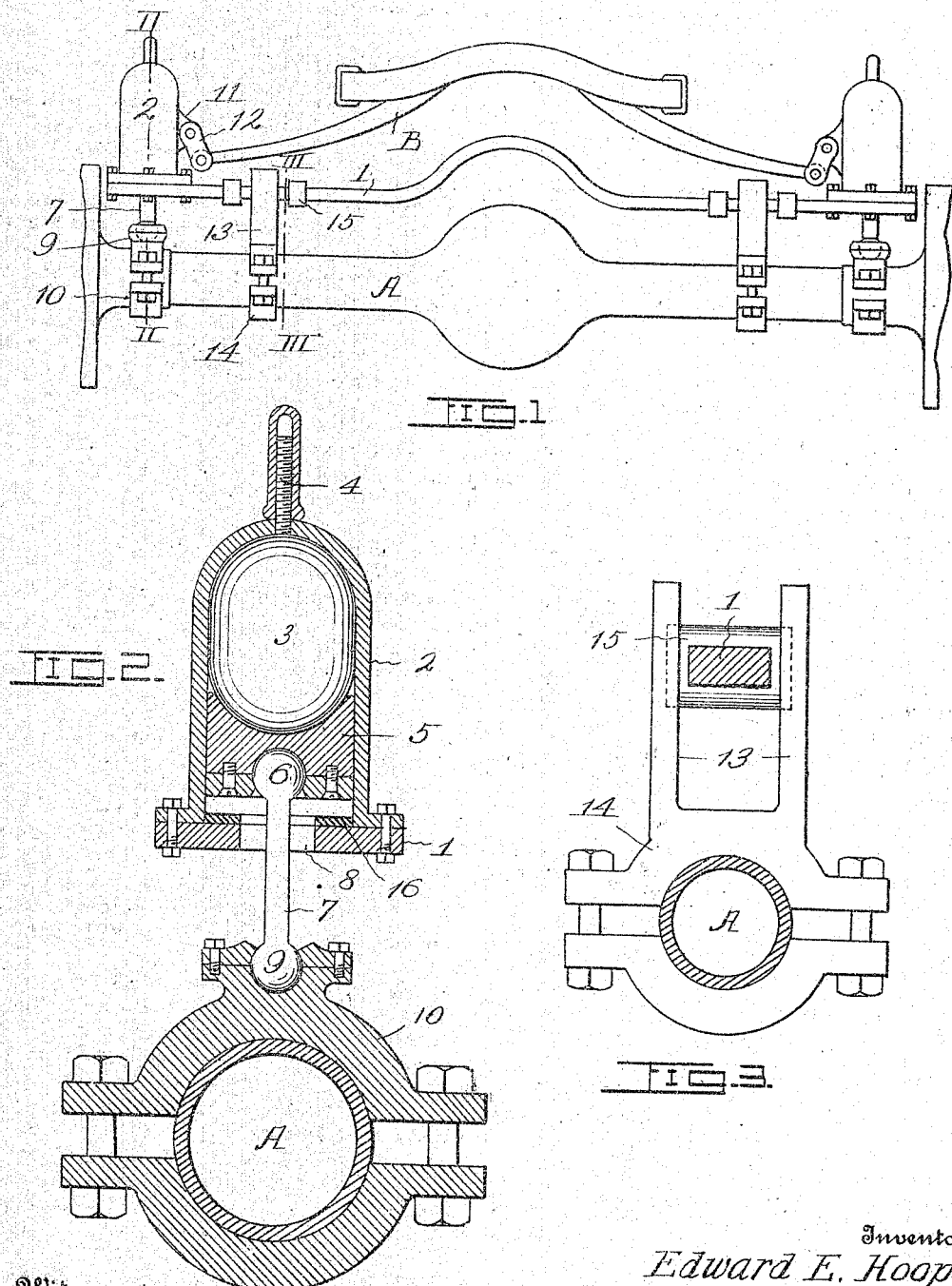

EDWARD E. HOOPS, OF KANSAS CITY, MISSOURI.

SHOCK-ABSORBER.

1,176,061.  Specification of Letters Patent.  Patented Mar. 21, 1916.

Application filed July 19, 1915. Serial No. 40,664.

*To all whom it may concern:*

Be it known that I, EDWARD E. HOOPS, a citizen of the United States, residing at Kansas City, in the county of Jackson and State of Missouri, have invented certain new and useful Improvements in Shock-Absorbers, of which the following is a specification.

My invention relates to shock absorbers for motor vehicles, and has for its object to provide a cushion for taking up the shock incident to the vehicle traveling over an uneven surface.

A further object is to provide a shock absorber particularly designed to eliminate the use of pneumatic tires or motor vehicles.

Further objects are to provide a shock absorber which is comparatively simple in construction and arrangement, strong, durable, and embodying all of the advantages of a pneumatic tire, with the disadvantages thereof reduced to a minimum.

Referring now to the accompanying drawing wherein like reference characters denote corresponding parts throughout the several views: Figure 1 is an elevation of the rear axle of a motor vehicle provided with my invention. Fig. 2 is an enlarged vertical cross section on line II—II of Fig. 1. Fig. 3 is an enlarged vertical cross section on line III—III of Fig. 1.

A designates the rear axle or housing of a motor vehicle. 1 designates a bar arranged above and independent of the axle A. Each end of said bar is provided with a fixedly-mounted cylinder 2, containing an inflatable member 3 made, preferably, of rubber. Said member 3 is provided with a valve 4, through which it may be inflated by a suitable air pump.

5 designates a reciprocatory plunger mounted in the lower portion of the cylinder 2 to act upon the inflated member 3. Said plunger 4 has a ball and socket connection 6 with a plunger stem 7, extending downward through a hole 8 in the bar 1 and connected by a ball-and-socket joint 9 to a clip 10, firmly secured to the axle A. The cylinders 2 have laterally projecting lugs 11 provided with shackles 12 connected to the ends of the rear vehicle spring B.

Lateral movement of the bar 1 is restricted by forks 13, extending upward at opposite sides therefrom from clips 14 firmly secured to the axle A, and longitudinal movement of said bar 1 is restricted by stops 15 firmly secured thereto at opposite sides of the forks 13.

16 designates a cushion surrounding the hole 8, for the plunger to impinge against should it move downward that far.

With the foregoing arrangement it is obvious that jolting of the axle compresses the inflated members 3, which ordinarily prevent vibration or shocks being imparted to the vehicle body, but should the jolting of the axle result in compressing the inflated members 3 to their maximum capacity the spring B is brought into play and unites with said inflated members in preventing or reducing vibration or shocks to the vehicle body.

As the inflated members 3 are entirely inclosed in the cylinders 2, it is obvious that they cannot be punctured by contact with glass, tacks, etc., lying upon the surface of the road and which so frequently result in puncture to the ordinary pneumatic tire.

While I have shown my device applied to the rear axle of a vehicle, it is obvious that it can also be applied to the front axle, and while I have shown and described the preferred form of construction it is to be understood that I may make such changes in the construction, proportion, and arrangement of parts as properly fall within the spirit and scope of the claims.

Having thus described my invention, what I claim and desire to secure by Letters Patent, is:

1. In a shock absorber for vehicles, in combination with the rear axle and cross spring, a bar between the axle and spring, a cylinder upon each end of the bar, a lateral inwardly extending lug on each cylinder, said spring extending across the space between the cylinders and having shackles connected to its ends and to said lugs, an inflated member in each cylinder, a plunger in each cylinder, and connecting means between the plungers and axles.

2. In a shock absorber for vehicles, in combination with the rear axle and cross spring, a bar between the axle and spring, a cylinder upon each end of the bar, said spring extending across the space between the cylinders, means pivotally connecting the ends of the springs to the cylinders, a plunger in each cylinder, and connecting means between the plungers and axles.

In testimony whereof I affix my signature in the presence of two witnesses.

EDWARD E. HOOPS.

Witnesses:
FRED C. FISCHER,
L. J. FISCHER.